United States Patent
Gaudinot et al.

(10) Patent No.: US 7,374,694 B2
(45) Date of Patent: May 20, 2008

(54) METHOD FOR REMINERALIZING RAW WATER

(75) Inventors: Jean-Claude Gaudinot, Francoville (FR); Gaid Abdelkader, Paris (FR)

(73) Assignee: OTV S.A. (FR)

( * ) Notice: Subject to any disclaimer, the term of this patent is extended or adjusted under 35 U.S.C. 154(b) by 924 days.

(21) Appl. No.: 10/472,995

(22) PCT Filed: Apr. 12, 2002

(86) PCT No.: PCT/FR02/01293

§ 371 (c)(1),
(2), (4) Date: Sep. 17, 2003

(87) PCT Pub. No.: WO02/083574

PCT Pub. Date: Oct. 24, 2002

(65) Prior Publication Data

US 2004/0104180 A1    Jun. 3, 2004

(30) Foreign Application Priority Data

Apr. 12, 2001 (FR) .................................. 01 05077

(51) Int. Cl.
  *C02F 1/66* (2006.01)
(52) U.S. Cl. ........................ 210/752; 210/718; 210/721; 210/724; 210/726; 210/743
(58) Field of Classification Search ................. 210/718
  See application file for complete search history.

(56) References Cited

U.S. PATENT DOCUMENTS

| | | | |
|---|---|---|---|
| 4,222,825 A | 9/1980 | Eisden | 203/11 |
| 4,839,057 A * | 6/1989 | White | 210/667 |
| 5,399,261 A | 3/1995 | Martin et al. | 210/195.1 |
| 5,525,224 A * | 6/1996 | Funahashi et al. | 210/205 |
| 5,695,646 A * | 12/1997 | Graf | 210/716 |
| 5,833,841 A * | 11/1998 | Koslowsky | 210/96.1 |
| 5,914,046 A * | 6/1999 | Watten | 210/712 |
| 5,993,737 A * | 11/1999 | Mackintosh et al. | 422/14 |
| 6,093,321 A * | 7/2000 | Bonnelye et al. | 210/610 |
| 6,572,902 B2 * | 6/2003 | Abramowitz et al. | 426/66 |
| 6,863,819 B2 * | 3/2005 | Maree | 210/631 |

FOREIGN PATENT DOCUMENTS

| | | |
|---|---|---|
| DE | 19616647 | 10/1997 |
| EP | 0031395 | 7/1981 |
| EP | 0520826 | 12/1992 |

\* cited by examiner

*Primary Examiner*—Peter A. Hruskoci
(74) *Attorney, Agent, or Firm*—Coats & Bennett, P.L.L.C.

(57) ABSTRACT

The invention relates to a method and installation for treating water for human consumption, for an industrial process, for agricultural purposes or for other purposes. The method used to remineralize raw water comprises a stage in which carbon dioxide and at least one inorganic base are injected. According to the invention, the method comprises the following stages: the flow Q of raw water is separated into a flow Q1 and a flow Q2; only flow Q1 is remineralized by injecting carbon dioxide and at least one inorganic base, said remineralization being carried out in at least one remineralization basin; remineralized flow Q1 is mixed with untreated flow Q2.

9 Claims, 1 Drawing Sheet

METHOD FOR REMINERALIZING RAW WATER

This application is a U.S. National Stage application of PCT Application No. PCT/FR02/01293, with an international filing date of Apr. 12, 2002. Applicant claims priority based on French application serial no. 01 05077 filed Apr. 12, 2001.

This invention relates to the field of water treatment. More precisely, the invention relates to a method and installation for treating water intended for human consumption, for an industrial process, for agricultural use or for other uses.

In this field, it is often necessary to carry out a treatment to correct the aggressivity of the water or to remineralize it, in particular when said water has a pH ranging between 2 and 9, low alkalinity and a low concentration of calcium and/or magnesium.

A treatment such as this can be carried out at the beginning of the line (pre-remineralization), along the line (inter-remineralization) or at the end of the line (final remineralization). The treatment may thus require one or more of these steps depending on the quality of the raw water.

Now, failure to remineralize the water may result in either an aggressivity of the water with respect to calcium, concrete or cement, or a corrosivity of the water with respect to metals. The structures and equipment associated with the water system may therefore be damaged, or even destroyed, and the water becomes turbid and acquires a red, green or other type of coloring.

In order to avoid such consequences, a partial or complete remineralization of the raw water is normally carried out in order to make it less aggressive or even non-aggressive with respect to all of the concrete containers (tanks, pipes, pipelines, basins, etc. . . . ) and to make it likewise less corrosive with respect to metals.

The degree of calcium carbonate equilibrium of water is generally measured by its saturation index, which is defined as being the difference between the pH of the water and the pH that it ought to have at the same degree of alkalinity in order to be in equilibrium (saturation pH).

Although the quality of raw water can vary greatly, it often has saturation index values ranging between −2 and −3.

By carrying out a partial remineralization, the saturation index is successfully brought to values ranging between −0.3 and −0.5, whereas after total remineralization, the water is brought to calcium carbonate equilibrium (saturation index equal to 0).

Therefore, the purpose of this type of treatment is to bring the saturation index to a value of 0 or close to 0.

Traditionally, this operation is carried out by injecting carbon dioxide and an inorganic base such as lime, soda, sodium carbonate or sodium bicarbonate. The mixing together of the reagents is carried out by means of a static mixer or in separate tanks (injection of one reagent per tank), or else in a single tank in which the two reagents are injected at the same time.

Figure 1:
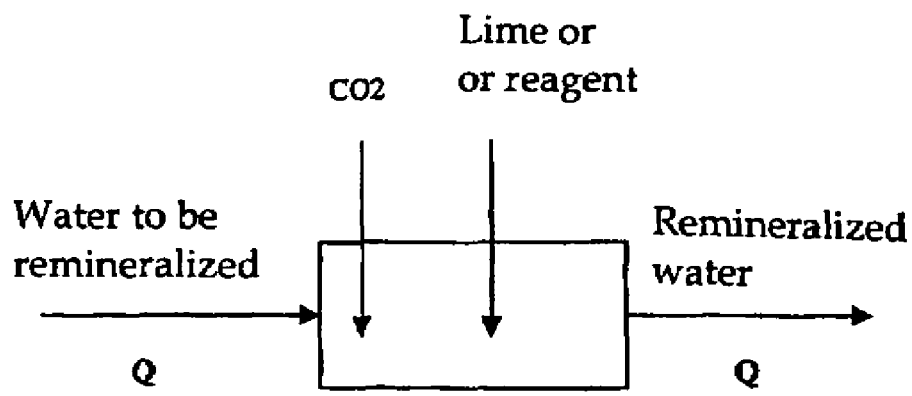

According to known techniques, the remineralization operation is carried out on the entire flow of water being treated, as illustrated in FIG. 1.

This technique has the disadvantage of requiring heavy equipment including, in particular, large numbers of tanks. As a matter of fact, experience shows that the costs generated by the required equipment substantially increase the overall cost of the water treatment installation, this being proven true in particular for large installations which require heavy maintenance and operation.

In particular, the invention has the purpose of alleviating this disadvantage of the state of the art.

More precisely, one purpose of the invention is to propose a method for remineralizing raw water which requires structures and equipment that are less bulky than those used with the prior art techniques.

The invention also has the purpose of proposing such a method which makes it possible to obtain substantial savings with respect to the costs associated with the installation, operation and maintenance of the prior art solutions.

These purposes, as well as others which will become apparent hereinafter, are achieved by means of a method for remineralizing raw water of the type including a step of injecting carbon dioxide and at least one inorganic base. According to the invention, the method comprises the steps of separating the flow Q of raw water into a flow Q1 and a flow Q2;

remineralizing only said flow Q1 by injecting carbon dioxide and at least one inorganic base, the remineralization being carried out in at least one remineralization tank;

mixing the remineralized flow Q1 with said untreated flow Q2.

A remineralization method is thus obtained whose maintenance and operation are simplified, while at the same time making it possible to obtain considerable savings on the cost of the equipment and accessories (pumps, valves, check valves, tubes, etc. . . . ).

In addition, the comparison between a remineralization of the entire flow and of only one portion of the flow according to the invention reveals large savings in space and work surfaces.

It shall be noted that a technique was known in prior art, according to EP 520 826, wherein a by-pass is used for injecting the reagents being used in the remineralization step. However, the actual remineralization itself takes place in a tank receiving the entire flow of water being treated and not, as in this invention, only a portion thereof.

According to a first advantageous solution, said inorganic base comprises lime injected in the form of lime milk.

According to another advantageous solution, said inorganic base comprises lime injected in the form of lime water. In this case, said injection of lime water is carried out by means of a lime saturator.

A rather precise adjustment in the desired final alkalinity is thus obtained by means of the lime saturator.

Other inorganic bases may of course be used in other embodiments without exceeding the scope of the invention.

According to one preferred solution, said injection of carbon dioxide is carried out either from the vents of a degassing tower for water charged with carbon dioxide or with the pure product.

Said flow $Q_1$ ranges advantageously between 5 and 95% of the flow Q.

By proceeding in this way, with a remineralization of only a portion of the raw water, the desired final qualities are successfully obtained in terms of alkalinity and calcium concentration, the corresponding saturation index falling between −0.5 and +0.1.

According to one particularly advantageous solution, said flow $Q_1$ is less than said flow $Q_2$.

In the case where the flow treated by an addition of reagents is less than 50% of the flow of raw water, substantial economic savings are actually obtained.

Preferably, said flow $Q_1$ represents approximately 30% of flow Q.

In this particular case, it shall be noted that it is possible to use structures that are three times less bulky than those used with the conventional complete remineralization techniques. Of course, other embodiments modifying the fraction of the treated flow may be anticipated without exceeding the scope of the invention.

According to one advantageous variant, the method includes at least one additional treatment step (clarification, oxidation, polishing) upstream and/or downstream from said treatment step of said flow $Q_1$.

Depending on the quality of the raw water and whether a partial or complete remineralization is desired, a final injection of the reagents (lime, soda, sodium carbonate) may actually be carried out over the entire flow after mixing the partial flows $Q_1$ and $Q_2$.

The invention also concerns any installation for the remineralization of water comprising at least one main water supply pipeline and means of injecting carbon dioxide and at least one inorganic base, characterized in that it includes at least one by-pass pipeline for a portion of the flow coming from the main pipeline, at least one remineralization tank provided on said by-pass pipeline, said injection means being provided on said by-pass pipeline and/or on said remineralization tank.

Figure 2:
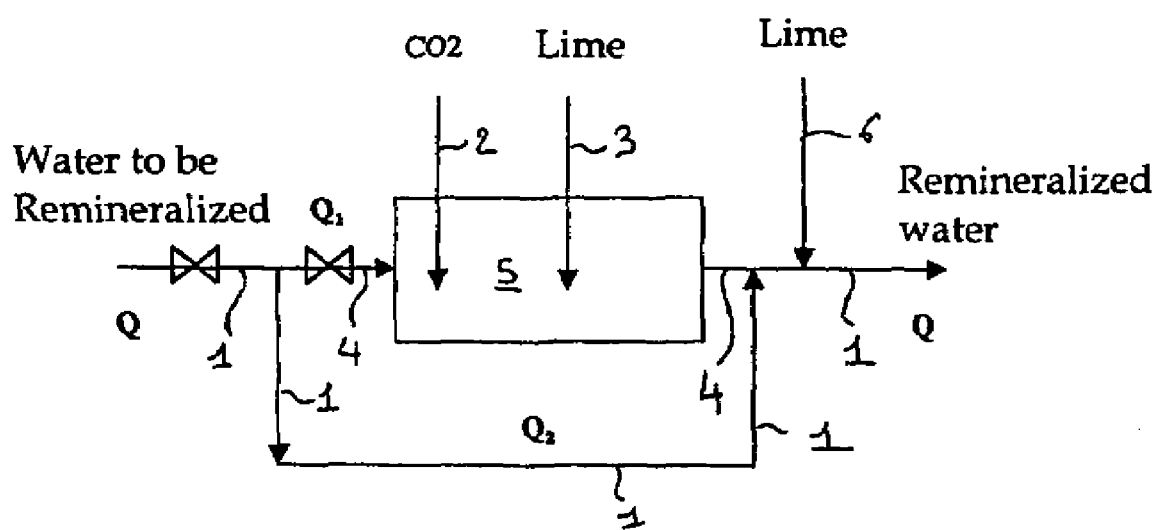

Other characteristics and advantages of the invention will become more apparent upon reading the following description of one preferred embodiment of the invention given as a non-limiting, illustrative example, and of the appended drawings in which:

FIG. 1 is a schematic illustration of a remineralization method according to prior art FIG. 2 is a schematic illustration of a remineralization installation according to the invention wherein only a fraction of the flow of raw water is treated.

As illustrated schematically in FIG. 1, the remineralization method according to the state of the art treats the entire flow Q of water to be remineralized by injecting carbon dioxide and lime (or another reagent).

According to the invention, as shown in FIG. 2, the flow Q of water to be remineralized is separated into two flows $Q_1$ and $Q_2$.

Flow $Q_1$, corresponding, according to this embodiment, to 30% of flow Q, undergoes a thorough remineralization treatment by injecting carbon dioxide and by adding appropriate reagents, in this case lime water, the injection of the latter being carried out by means of a lime saturator.

Another embodiment might consist in injecting the lime in the form of lime milk.

The injection of carbon dioxide is carried out from the vents of a degassing tower (not shown) for water charged with carbon dioxide. In other embodiments, the injection of carbon dioxide may be carried out using the pure product.

According to FIG. 2, the embodiment of an installation for the remineralization of water according to this invention shows a main water supply pipeline 1 and means of injecting 2, 3 CO2 and lime. This installation also has a by-pass pipeline 4 for a portion of the flow of water coming from the main pipeline 1, and a remineralization tank 5 provided on said by-pass pipeline 4. According to this invention, the injection means 2, 3 are provided on the remineralization tank 5. The portion of the flow of water remineralized in the tank 5 is then returned to the main pipeline 1. The installation also includes means of injecting 6 lime into the main pipeline 1 after the portion of the flow remineralized in the tank 4 has been returned to said pipeline.

As shown clearly in FIG. 2, the flow $Q_2$ forms a by-pass of the treatment step undergone by the flow $Q_1$.

Upon exiting the treatment step of flow $Q_1$, the flows $Q_1$ and $Q_2$ are mixed together, thus forming a flow Q of remineralized water.

According to this preferred embodiment of the invention, the flow Q of remineralized water may undergo an additional treatment step by adding lime, depending on the final desired water quality.

The advantages of the method according to the invention will now be highlighted by a comparative study of a complete remineralization method according to the state of the art and a method of remineralizing only a fraction of the flow of raw water according to the invention.

This comparative study is conducted using raw water having the following characteristics:
flow rate: 1,000 m³/h;
temperature: 20° C.;
pH: 6.5;
free $CO_2$: 6.72;
alkalinity: 10 mg/l $CaCO_3$;
calcium: 2 mg/l.

After treatment within the framework of a
method for remineralizing the entire flow of raw water, the latter has the following characteristics
flow rate: 1,000 m³/h;
pH: 7.87;
saturation pH: 7.87;
saturation index: 0;
free $CO_2$: 2.71 mg/l.
alkalinity: 104 mg/l $CaCO_3$;
calcium: 39.9 mg/l.

During the course of the method for remineralizing the entire flow of raw water, the carbon dioxide is injected at the rate of 76 g/m³ and the lime at 69.56 g/m³, the lime saturator required for implementing this method having the following characteristics:
mirror velocity: 6 m/h;
unit area: 1,000/6=166.6 m²;
volume of the reaction tank: 1,000×10/60=166.6 m³ (for a contact time of 10 min.).

Within the framework now of the method according to the invention, during the course of which only 30% of the flow of water to be remineralized is treated, the treatment is carried out by injecting carbon dioxide at the rate of 222 g/m³. The fraction of the flow treated has the following characteristics:
flow rate: 300 m³/h;
pH: 7.06;
saturation pH: 7.06;
saturation index: 0;
free $CO_2$: 42.73 mg/l;
alkalinity: 270 mg/l $CaCO_3$;
calcium: 106 mg/l.

The saturator used to obtain this result has the following characteristics:
mirror velocity: 6 m/h;
unit area: 300/6=6=50 m²;
volume of the reaction tank: 300×10/60=50 m³ (for a contact time of 10 min.).

After mixing the flow of treated water and the flow of untreated water, the water has the following characteristics:
flow rate: 1,000 m³/h;
pH: 6.99;
saturation pH: 8.01;
saturation index: −1.02;
free $CO_2$: 17.52 mg/l;
alkalinity: 88 mg/l $CaCO_3$;
calcium: 33.2 mg/l.

After a final step consisting in adding lime at the rate of 12.4 g/m³, the water has the following characteristics at the end of the method according to the invention:
flow rate: 1,000 m³/h;
pH: 7.86;
saturation pH: 7.86;
saturation index: 0;
free $CO_2$: 2.77 mg/l;
alkalinity: 104.8 mg/l $CaCO_3$;
calcium: 39.92 mg/l.

It is noted then, that for a remineralized water quality having almost identical characteristics after being treated, the lime saturator used within the framework of the method according to the invention requires a unit area more that three times smaller that that of the lime saturator used within the framework of the method for remineralizing the entire flow of raw water.

Therefore, this comparative study demonstrates that the method according to the invention makes it possible to obtain substantial savings with respect to the total investments (equipment and accessories) associated with a water treatment installation.

Other embodiments using the principle of the method just described for remineralizing only a fraction of the flow of raw water may, of course, be anticipated without exceeding the scope of the invention.

The invention claimed is:

1. A method for remineralizing raw water comprising:
separating an input flow of raw water into a first flow of raw water and a second flow of raw water, wherein the first flow is less than 50% of said input flow;
directing the first flow of raw water into a remineralization tank;
bypassing the remineralization tank with the second flow of raw water;
remineralizing the water in the remineralization tank by injecting carbon dioxide and an inorganic base into the remineralization tank and contacting the water in the tank with the carbon dioxide and the inorganic base for a selected residency time to obtain a saturation index between −0.5 and +0.1;
directing remineralized water from the remineralization tank;
mixing the remineralized water with the second flow of raw water; and injecting an inorganic base into the remineralized water after the first and second flows have been mixed.

2. The method of claim 1 wherein separating the input flow of raw water into first and second flows of raw water comprises separating the input flow such that the first flow of raw water comprises approximately 30% of the input flow of raw water.

3. The method of claim 1 wherein the raw water has a saturation index less than −2 and the method includes remineralizing water to a saturation index between −0.5 and 0.

4. The method of claim 1 wherein separating the input flow of raw water into said first and second flows of raw water comprises separating the input flow of raw water such that said first flow of raw water comprises approximately 30% of the input flow of raw water; wherein the raw water has a saturation index less than approximately −2; and the method includes remineralizing water to a saturation index between approximately −0.5 and approximately 0.

5. The method of claim 1 wherein remineralization only occurs in the remineralization tank.

6. A method for remineralizing raw water wherein substantially all remineralization occurs in a remineralization tank, the method comprising:
separating an input flow of raw water into a first flow of raw water and a second flow of raw water, wherein the first flow is less than 50% of said input flow;
directing the first flow of raw water into a remineralization tank;
bypassing the remineralization tank with the second flow of raw water;
remineralizing the water in the remineralization tank by injecting carbon dioxide and an inorganic base into the remineralization tank and contacting the water in the tank with the carbon dioxide and the inorganic base for a selected residency time to obtain a saturation index between −0.5 and +0.1;
directing remineralized water from the remineralization tank;
mixing the remineralized water with the second flow of raw water to form a remineralized water mixture; and
mixing an inorganic base with the remineralized water mixture.

7. The method of claim 6 wherein separating the input flow of raw water into first and second flows of raw water comprises separating the input flow such that the first flow of raw water comprises approximately 30% of the input flow of raw water.

8. The method of claim 6 wherein the raw water has a saturation index less than approximately −2 and the method includes remineralizing water to a saturation index between approximately −0.5 and approximately 0.

9. The method of claim 6 wherein separating the input flow of raw water into said first and second flows of raw water comprises separating the input flow of raw water such that said first flow of raw water comprises approximately 30% of the input flow of raw water; and wherein the raw water has a saturation index less than approximately −2 and the method includes remineralizing water to a saturation index between approximately −0.5 and approximately 0.

* * * * *